United States Patent
Jung et al.

(10) Patent No.: US 9,702,713 B2
(45) Date of Patent: Jul. 11, 2017

(54) MAP-BASED GUIDE SYSTEM AND METHOD

(71) Applicant: SEARETE LLC, Bellevue, WA (US)

(72) Inventors: Edward K. Y. Jung, Bellevue, WA (US); Royce A. Levien, Lexington, MA (US); Robert W. Lord, Seattle, WA (US); Mark A. Malamud, Seattle, WA (US); John D. Rinaldo, Jr., Bellevue, WA (US)

( * ) Notice: Subject to any disclaimer, the term of this patent is extended or adjusted under 35 U.S.C. 154(b) by 0 days.

(21) Appl. No.: 14/927,116

(22) Filed: Oct. 29, 2015

(65) Prior Publication Data
US 2016/0109247 A1  Apr. 21, 2016

Related U.S. Application Data

(63) Continuation-in-part of application No. 14/321,544, filed on Jul. 1, 2014, now Pat. No. 9,286,729, which is a continuation-in-part of application No. 14/276,791, filed on May 13, 2014, now Pat. No. 9,214,033, which is a continuation-in-part of application No. 14/046,842, filed on Oct. 4, 2013, now Pat. No. 8,805,027, which is a continuation-in-part of application No. 13/757,538, filed on Feb. 1, 2013, now Pat. No. 8,768,610, which is a continuation-in-part of application No. 13/622,337, filed on Sep. 18, 2012, now Pat. No. 8,582,827, which is a continuation-in-part of application No. 13/136,600, filed on Aug. 4, 2011, now Pat. No. 8,392,114, which is a
(Continued)

(51) Int. Cl.
*G01C 21/34* (2006.01)
*H04W 4/00* (2009.01)
*G06F 17/30* (2006.01)
*G09B 29/10* (2006.01)
*G01C 21/36* (2006.01)
*H04W 4/02* (2009.01)

(52) U.S. Cl.
CPC ......... *G01C 21/34* (2013.01); *G01C 21/3453* (2013.01); *G01C 21/362* (2013.01); *G06F 17/30241* (2013.01); *G09B 29/106* (2013.01); *H04W 4/00* (2013.01); *H04W 4/02* (2013.01)

(58) Field of Classification Search
CPC .......... G01C 21/34; H04W 4/00; G09B 29/10
USPC ......................... 701/410, 409, 414, 420, 428
See application file for complete search history.

(56) References Cited

U.S. PATENT DOCUMENTS 4,301,506 A   11/1981  Turco
4,528,552 A    7/1985  Moriyama et al.
(Continued)

OTHER PUBLICATIONS

"TomTom Navigator—Traffic Plug-In"; Tomtom Navigator; created on Dec. 8, 2015; pp. 1-14; TomTom B.V., The Netherlands.
(Continued)

*Primary Examiner* — Tan Q Nguyen
(74) *Attorney, Agent, or Firm* — Eugenio J. Torres; Victor Rodrigue-Reyes; Ferraiuoli LLC

(57) ABSTRACT

Provided is a computer system and methods for a map-based guide. A method includes but is not limited to receiving a request for the map-based guide; determining a location associated with the request; preparing a route in accordance with the location associated with the request and in accordance with at least one of a profit-motive and/or a goodwill factor; and transmitting the map-based guide.

20 Claims, 4 Drawing Sheets

Related U.S. Application Data continuation-in-part of application No. 13/134,848, filed on Jun. 17, 2011, now abandoned, which is a continuation-in-part of application No. 12/928,446, filed on Dec. 9, 2010, now abandoned, which is a continuation-in-part of application No. 12/804,708, filed on Jul. 26, 2010, now Pat. No. 8,270,683, which is a continuation-in-part of application No. 12/804,021, filed on Jul. 12, 2010, now Pat. No. 8,077,928, which is a continuation-in-part of application No. 12/802,441, filed on Jun. 7, 2010, now Pat. No. 8,107,691, which is a continuation-in-part of application No. 12/800,954, filed on May 26, 2010, which is a continuation-in-part of application No. 12/406,478, filed on Mar. 18, 2009, now Pat. No. 7,860,648, which is a continuation-in-part of application No. 12/231,325, filed on Aug. 29, 2008, now Pat. No. 7,734,073, which is a continuation-in-part of application No. 12/231,314, filed on Aug. 29, 2008, now Pat. No. 7,764,811, which is a continuation-in-part of application No. 11/998,871, filed on Nov. 30, 2007, now abandoned, which is a continuation-in-part of application No. 11/998,827, filed on Nov. 29, 2007, now Pat. No. 8,635,014, which is a continuation-in-part of application No. 11/998,450, filed on Nov. 28, 2007, now Pat. No. 9,188,454, which is a continuation-in-part of application No. 11/124,626, filed on Apr. 30, 2005, now Pat. No. 7,522,996, which is a continuation-in-part of application No. 11/086,973, filed on Mar. 22, 2005, now abandoned, which is a continuation-in-part of application No. 11/066,112, filed on Feb. 25, 2005, now Pat. No. 7,756,300, which is a continuation-in-part of application No. 11/047,465, filed on Jan. 31, 2005, now Pat. No. 7,729,708.

(56) References Cited

U.S. PATENT DOCUMENTS

| | | |
|---|---|---|
| 4,546,439 A | 10/1985 | Esparza |
| 4,570,227 A | 2/1986 | Tachi et al. |
| 4,646,089 A | 2/1987 | Takanabe et al. |
| 4,734,863 A | 3/1988 | Honey et al. |
| 4,764,873 A | 8/1988 | Libby |
| 4,796,189 A | 1/1989 | Nakayama et al. |
| 4,866,626 A | 9/1989 | Egli |
| 4,876,651 A | 10/1989 | Dawson et al. |
| 4,890,104 A | 12/1989 | Takanabe et al. |
| 4,914,605 A | 4/1990 | Loughmiller et al. |
| 4,926,336 A | 5/1990 | Yamada |
| 4,937,753 A | 6/1990 | Yamada |
| 4,954,958 A | 9/1990 | Savage et al. |
| 4,962,458 A | 10/1990 | Verstraete |
| 4,974,170 A | 11/1990 | Bouve et al. |
| 5,031,104 A | 7/1991 | Ikeda et al. |
| 5,041,983 A | 8/1991 | Nakahara et al. |
| 5,067,081 A | 11/1991 | Person |
| 5,115,339 A | 5/1992 | Martino et al. |
| 5,115,399 A | 5/1992 | Nimura et al. |
| 5,168,452 A | 12/1992 | Yamada et al. |
| 5,170,353 A | 12/1992 | Verstraete |
| 5,172,321 A | 12/1992 | Ghaem et al. |
| 5,189,430 A | 2/1993 | Yano et al. |
| 5,191,406 A | 3/1993 | Brandestini et al. |
| 5,191,532 A | 3/1993 | Moroto et al. |
| 5,231,584 A | 7/1993 | Nimura et al. |
| 5,270,937 A | 12/1993 | Link et al. |
| 5,274,387 A | 12/1993 | Kakihara et al. |
| 5,293,163 A | 3/1994 | Kakihara et al. |
| 5,739,772 A | 4/1998 | Nanba et al. |
| 5,802,526 A | 9/1998 | Fawcett et al. |
| 5,844,570 A | 12/1998 | Curtright et al. |
| 5,848,373 A | 12/1998 | DeLorme et al. |
| 5,884,262 A | 3/1999 | Wise et al. |
| 5,948,040 A | 9/1999 | DeLorme et al. |
| 6,009,403 A | 12/1999 | Sato |
| 6,084,882 A | 7/2000 | Ogura et al. |
| 6,104,790 A | 8/2000 | Narayanaswami |
| 6,119,095 A | 9/2000 | Morita |
| 6,240,360 B1 | 5/2001 | Phelan |
| 6,321,158 B1 | 11/2001 | DeLorme et al. |
| 6,351,710 B1 | 2/2002 | Mays |
| 6,381,534 B2 | 4/2002 | Takayama et al. |
| 6,498,982 B2 | 12/2002 | Bellesfield et al. |
| 6,498,983 B2 | 12/2002 | Hashida |
| 6,526,352 B1 | 2/2003 | Breed et al. |
| 6,542,593 B1 | 4/2003 | Bowman-Amuah |
| 6,553,309 B2 | 4/2003 | Uchida et al. |
| 6,570,595 B2 | 5/2003 | Porter |
| 6,636,803 B1 | 10/2003 | Hartz, Jr. et al. |
| 6,680,999 B1 | 1/2004 | Garcia |
| 6,687,610 B2 | 2/2004 | Hashida |
| 6,718,017 B1 | 4/2004 | Price et al. |
| 6,728,731 B2 | 4/2004 | Sarukkai et al. |
| 6,731,625 B1 | 5/2004 | Eastep et al. |
| 6,751,626 B2 | 6/2004 | Brown et al. |
| 6,801,604 B2 | 10/2004 | Maes et al. |
| 6,816,779 B2 | 11/2004 | Chen et al. |
| 6,826,474 B2 | 11/2004 | Miyahara et al. |
| 6,839,023 B1 | 1/2005 | Benco et al. |
| 6,862,524 B1 * | 3/2005 | Nagda ............... G01C 21/3492 340/988 |
| 6,868,333 B2 | 3/2005 | Melen |
| 6,957,250 B1 | 10/2005 | Nakano |
| 6,993,350 B2 | 1/2006 | Katoh |
| 7,012,564 B2 | 3/2006 | Abraham |
| 7,058,507 B2 | 6/2006 | Saiki |
| 7,103,472 B2 | 9/2006 | Itabashi |
| 7,116,977 B1 | 10/2006 | Moton, Jr. et al. |
| 7,148,861 B2 | 12/2006 | Yelton et al. |
| 7,236,173 B2 | 6/2007 | Chithambaram et al. |
| 7,292,935 B2 | 11/2007 | Yoon |
| 7,342,516 B2 | 3/2008 | Kato et al. |
| 7,376,510 B1 | 5/2008 | Green |
| 7,447,593 B2 | 11/2008 | Estkowski et al. |
| 7,519,372 B2 | 4/2009 | Rowitch et al. |
| 7,565,155 B2 | 7/2009 | Sheha et al. |
| 7,577,520 B2 | 8/2009 | Nomura |
| 7,734,019 B1 | 6/2010 | Terpstra |
| 7,890,376 B2 | 2/2011 | Barrese et al. |
| 8,095,467 B2 | 1/2012 | Bettinger |
| 8,296,335 B2 | 10/2012 | Bouve et al. |
| 8,504,284 B2 | 8/2013 | Brulle-Drews et al. |
| 9,020,751 B1 * | 4/2015 | Bogovich ............ G06Q 40/08 340/995.28 |
| 2002/0032035 A1 | 3/2002 | Teshima |
| 2002/0077745 A1 | 6/2002 | Ohmura et al. |
| 2002/0102993 A1 | 8/2002 | Hendrey et al. |
| 2002/0156739 A1 | 10/2002 | Hirai et al. |
| 2002/0174003 A1 | 11/2002 | Redmann et al. |
| 2003/0011467 A1 | 1/2003 | Suomela |
| 2003/0036955 A1 | 2/2003 | Tanaka et al. |
| 2003/0134648 A1 | 7/2003 | Reed et al. |
| 2003/0210806 A1 | 11/2003 | Yoichi et al. |
| 2003/0212567 A1 | 11/2003 | Shintani et al. |
| 2003/0236818 A1 * | 12/2003 | Bruner ............... G01C 21/34 709/200 |
| 2004/0015293 A1 | 1/2004 | Randazzo et al. |
| 2004/0030493 A1 | 2/2004 | Pechatnikov et al. |
| 2004/0054428 A1 | 3/2004 | Sheha et al. |
| 2004/0070620 A1 | 4/2004 | Fujisawa |
| 2004/0172192 A1 | 9/2004 | Knutson |
| 2004/0193707 A1 | 9/2004 | Alam et al. |
| 2004/0201501 A1 * | 10/2004 | Daizen ............... G01C 21/34 340/995.16 |
| 2004/0217884 A1 | 11/2004 | Samadani et al. |
| 2004/0224703 A1 | 11/2004 | Takaki et al. |
| 2004/0249955 A1 | 12/2004 | Wuerful |
| 2004/0254723 A1 | 12/2004 | Tu |
| 2005/0032556 A1 | 2/2005 | Bennett et al. |

(56) References Cited

U.S. PATENT DOCUMENTS

| | | |
|---|---|---|
| 2005/0033511 A1 | 2/2005 | Pechatnikov et al. |
| 2005/0072116 A1 | 4/2005 | Bunte |
| 2005/0102099 A1 | 5/2005 | Linn |
| 2005/0102245 A1 | 5/2005 | Edlund et al. |
| 2005/0113123 A1 | 5/2005 | Torvinen |
| 2005/0131643 A1 | 6/2005 | Shaffer et al. |
| 2006/0040670 A1 | 2/2006 | Li et al. |
| 2006/0058948 A1 | 3/2006 | Blass et al. |
| 2006/0123014 A1 | 6/2006 | Ng |
| 2006/0129313 A1* | 6/2006 | Becker ............... G01C 21/3484 701/533 |
| 2006/0168592 A1 | 7/2006 | Andrews et al. |
| 2008/0114542 A1* | 5/2008 | Nambata .......... G08G 1/096827 701/533 |
| 2009/0006190 A1* | 1/2009 | Lucash ................ G06Q 30/02 705/14.71 |

OTHER PUBLICATIONS

Bobrich, Joachim, et al.; "Augmented Maps"; Symposium on Geospatial Theory, Processing and Applications; bearing a date of 2002; University of Hanover.

"ESPATIAL: iSMART" Overview; bearing adate of Feb. 8, 2005; 3 pp.; located at www.espatial.com/page455 html.

Gluck, Myke, Ph.D., et al.; "Augmented Seriation: Usability of a Visual and Auditory Tool for Geographic Pattern Discovery with Risk Perception Data"; GeoComputation; bearing a date of 1999; p. 1.

Hall, T. Brett et al.; "A Novel Interactivity Environment for Integrated Intelligent Transportation and Telematic Systems"; 5$^{th}$ Intl. IEEE Conf.; bearing a date of Sep. 3, 2002; Singapore.

"Introduction to Augmented Reality"; bearing a date of Dec. 15, 2004; 11 pages; located at www.se.rit.edu/-jrv/research/ar/introduction html.

Lowe, Jonathan W.; "Raster-Oriented Technology Supports Public Internet Applications That Manage Larger Raster Collections," Geospatial Solutions; bearing a date of Oct. 2004; 4 pages.

"Seattle Area Traffic Home Web Page"; bearing a date of Dec. 10, 2004, 11:14 A.M.; located at www.esdot.wa.gov/traffic/seattle.

Wei, Li-Yi and LeVoy, Marc; "Fast Texture Synthesis Using Tree-Structured Vector Quantization"; pp. 1-10; Stanford University.

Zhong, David X.; "Color Space Analysis and Color Image Segmentation"; pp. 1-5; School of Electrical and Information Engineering, The University of Sydney.

Hristova et al.; "Ad-me: Wireless Advertising Adapted to the User Location, Device and Emotions"; 37$^{th}$ Hawaii International Conference on System Sciences; bearing a date of 2004; pp. 1-10; 0-7695-2056-1/04; © 2004 IEEE.

* cited by examiner

MAP-BASED GUIDE SYSTEM AND METHOD

If an Application Data Sheet (ADS) has been filed on the filing date of this application, it is incorporated by reference herein. Any applications claimed on the ADS for priority under 35 U.S.C. §§119, 120, 121 or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 U.S.C. §119(e) for provisional patent applications, for any and all parent, grandparent, great-grandparent, etc. applications of the Priority Application(s)). In addition, the present application is related to the "Related Application(s)," if any, listed below:

PRIORITY APPLICATIONS

For purposes of the USPTO extra-statutory requirements, the present application constitutes a continuation-in-part of U.S. patent application Ser. No. 14/321,544, entitled IMAGE MAPPING TO PROVIDE VISUAL GEOGRAPHIC PATH, naming Edward K. Y. Jung; Royce A. Levien; Robert W. Lord; Mark A. Malamud; and John D. Rinaldo, Jr. as inventors, filed 1 Jul. 2014, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/276,791, entitled MAP DISPLAY SYSTEM AND METHOD, naming Edward K. Y. Jung; Royce A. Levien; Robert W. Lord; Mark A. Malamud; and John D. Rinaldo, Jr. as inventors, filed 13 May 2014, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/046,842, entitled IMAGE MAPPING TO PROVIDE VISUAL GEOGRAPHIC PATH, naming Edward K. Y. Jung; Royce A. Levien; Robert W. Lord; Mark A. Malamud; and John D. Rinaldo, Jr. as inventors, filed 4 Oct. 2013, and issued 12 Aug. 2014 as U.S. Pat. No. 8,805,027, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/757,538, entitled MAP DISPLAY SYSTEM AND METHOD, naming Edward K. Y. Jung; Royce A. Levien; Robert W. Lord; Mark A. Malamud; and John D. Rinaldo, Jr. as inventors, filed 1 Feb. 2013, and issued 1 Jul. 2014 as U.S. Pat. No. 8,768,610, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/622,337, entitled IMAGE MAPPING TO PROVIDE VISUAL GEOGRAPHIC PATH, naming Edward K. Y. Jung; Royce A. Levien; Robert W. Lord; Mark A. Malamud; and John D. Rinaldo, Jr. as inventors, filed 18 Sep. 2012, and issued 12 Nov. 2013 as U.S. Pat. No. 8,582,827, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/136,600, entitled MAP DISPLAY SYSTEM AND METHOD, naming Edward K. Y. Jung; Royce A. Levien; Robert W. Lord; Mark A. Malamud; and John D. Rinaldo, Jr. as inventors, filed 4 Aug. 2011, and issued 5 Mar. 2013 as U.S. Pat. No. 8,392,114, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/134,848, entitled MAP-BASED GUIDE SYSTEM AND METHOD, naming Edward K. Y. Jung; Royce A. Levien; Robert W. Lord; Mark A. Malamud; and John D. Rinaldo, Jr. as inventors, filed 17 Jun. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 12/928,446, entitled MAP DISPLAY SYSTEM AND METHOD, naming Edward K. Y. Jung; Royce A. Levien; Robert W. Lord; Mark A. Malamud; and John D. Rinaldo, Jr. as inventors, filed 9 Dec. 2010, which is currently co-pending or is an application of which a currently co-pending application is entitled to the benefit of the filing date.

For purposes of the USPTO extra-statutory requirements, the present application constitutes a continuation-in-part of U.S. patent application Ser. No. 12/804,708, entitled IMAGE MAPPING TO PROVIDE VISUAL GEOGRAPHIC PATH, naming Edward K. Y. Jung; Royce A. Levien; Robert W. Lord; Mark A. Malamud; and John D. Rinaldo, Jr. as inventors, filed 26 Jul. 2010, and issued 18 Sep. 2012 as U.S. Pat. No. 8,270,683, which is currently co-pending or is an application of which a currently co-pending application is entitled to the benefit of the filing date.

For purposes of the USPTO extra-statutory requirements, the present application constitutes a continuation-in-part of U.S. patent application Ser. No. 12/804,021, entitled IMAGE MAPPING TO PROVIDE VISUAL GEOGRAPHIC PATH, naming Edward K. Y. Jung; Royce A. Levien; Robert W. Lord; Mark A. Malamud; and John D. Rinaldo, Jr. as inventors, filed 12 Jul. 2010, and issued 13 Dec. 2011 as U.S. Pat. No. 8,077,928, which is currently co-pending or is an application of which a currently co-pending application is entitled to the benefit of the filing date.

For purposes of the USPTO extra-statutory requirements, the present application constitutes a continuation-in-part of U.S. patent application Ser. No. 12/802,441, entitled IMAGE MAPPING TO PROVIDE VISUAL GEOGRAPHIC PATH, naming Edward K. Y. Jung; Royce A. Levien; Robert W. Lord; Mark A. Malamud; and John D. Rinaldo, Jr. as inventors, filed 7 Jun. 2010, and issued 31 Jan. 2012 as U.S. Pat. No. 8,107,691, which is currently co-pending or is an application of which a currently co-pending application is entitled to the benefit of the filing date.

For purposes of the USPTO extra-statutory requirements, the present application constitutes a continuation-in-part of U.S. patent application Ser. No. 12/800,954, entitled METHOD AND SYSTEM FOR INTERACTIVE MAPPING TO PROVIDE GOAL-ORIENTED INSTRUCTIONS, naming Edward K. Y. Jung; Royce A. Levien; Robert W. Lord; Mark A. Malamud; and John D. Rinaldo, Jr. as inventors, filed 26 May 2010, which is currently co-pending or is an application of which a currently co-pending application is entitled to the benefit of the filing date.

For purposes of the USPTO extra-statutory requirements, the present application constitutes a continuation-in-part of U.S. patent application Ser. No. 12/406,478, entitled MAP DISPLAY SYSTEM AND METHOD, naming Edward K. Y. Jung; Royce A. Levien; Robert W. Lord; Mark A. Malamud; and John D. Rinaldo, Jr. as inventors, filed 18 Mar. 2009, and issued 28 Dec. 2010 as U.S. Pat. No. 7,860,648, which is currently co-pending or is an application of which a currently co-pending application is entitled to the benefit of the filing date.

For purposes of the USPTO extra-statutory requirements, the present application constitutes a continuation-in-part of U.S. patent application Ser. No. 12/231,325, entitled IMAGE MAPPING TO PROVIDE VISUAL GEOGRAPHIC PATH, naming Edward K. Y. Jung; Royce A. Levien; Robert W. Lord; Mark A. Malamud; and John D. Rinaldo, Jr. as inventors, filed 29 Aug. 2008, and issued 8 Jun. 2010 as U.S. Pat. No. 7,734,073, which is currently co-pending or is an application of which a currently co-pending application is entitled to the benefit of the filing date.

For purposes of the USPTO extra-statutory requirements, the present application constitutes a continuation-in-part of U.S. patent application Ser. No. 12/231,314, entitled IMAGE MAPPING TO PROVIDE VISUAL GEOGRAPHIC PATH, naming Edward K. Y. Jung; Royce A. Levien; Robert W. Lord; Mark A. Malamud; and John D. Rinaldo, Jr. as inventors, filed 29 Aug. 2008, and issued 27 Jul. 2010 as U.S. Pat. No. 7,764,811, which is currently co-pending or is an application of which a currently co-pending application is entitled to the benefit of the filing date.

For purposes of the USPTO extra-statutory requirements, the present application constitutes a continuation-in-part of U.S. patent application Ser. No. 11/998,871, entitled MAP-BASED GUIDE SYSTEM AND METHOD, naming Edward K. Y. Jung; Royce A. Levien; Robert W. Lord; Mark A. Malamud; and John D. Rinaldo, Jr. as inventors, filed 30 Nov. 2007, which is currently co-pending or is an application of which a currently co-pending application is entitled to the benefit of the filing date.

For purposes of the USPTO extra-statutory requirements, the present application constitutes a continuation-in-part of U.S. patent application Ser. No. 11/998,827, entitled MAP-BASED GUIDE SYSTEM AND METHOD, naming Edward K. Y. Jung; Royce A. Levien; Robert W. Lord; Mark A. Malamud; and John D. Rinaldo, Jr. as inventors, filed 29 Nov. 2007, and issued 21 Jan. 2014 as U.S. Pat. No. 8,635,014, which is currently co-pending or is an application of which a currently co-pending application is entitled to the benefit of the filing date.

For purposes of the USPTO extra-statutory requirements, the present application constitutes a continuation-in-part of U.S. patent application Ser. No. 11/998,450, entitled MAP-BASED GUIDE SYSTEM AND METHOD, naming Edward K. Y. Jung; Royce A. Levien; Robert W. Lord; Mark A. Malamud; and John D. Rinaldo, Jr. as inventors, filed 28 Nov. 2007, which is currently co-pending or is an application of which a currently co-pending application is entitled to the benefit of the filing date.

For purposes of the USPTO extra-statutory requirements, the present application constitutes a continuation-in-part of U.S. patent application Ser. No. 11/124,626, entitled MAP DISPLAY SYSTEM AND METHOD, naming Edward K. Y. Jung; Royce A. Levien; Robert W. Lord; Mark A. Malamud; and John D. Rinaldo, Jr. as inventors, filed 30 Apr. 2005, and issued 21 Apr. 2009 as U.S. Pat. No. 7,522,996, which is currently co-pending or is an application of which a currently co-pending application is entitled to the benefit of the filing date.

For purposes of the USPTO extra-statutory requirements, the present application constitutes a continuation-in-part of U.S. patent application Ser. No. 11/086,973, entitled MAP-BASED GUIDE SYSTEM AND METHOD, naming Edward K. Y. Jung; Royce A. Levien; Robert W. Lord; Mark A. Malamud; and John D. Rinaldo, Jr. as inventors, filed 22 Mar. 2005, which is currently co-pending or is an application of which a currently co-pending application is entitled to the benefit of the filing date.

For purposes of the USPTO extra-statutory requirements, the present application constitutes a continuation-in-part of U.S. patent application Ser. No. 11/066,112, entitled IMAGE MAPPING TO PROVIDE VISUAL GEOGRAPHIC PATH, naming Edward K. Y. Jung; Royce A. Levien; Robert W. Lord; Mark A. Malamud; and John D. Rinaldo, Jr. as inventors, filed 25 Feb. 2005, and issued 13 Jul. 2010 as U.S. Pat. No. 7,756,300, which is currently co-pending or is an application of which a currently co-pending application is entitled to the benefit of the filing date.

For purposes of the USPTO extra-statutory requirements, the present application constitutes a continuation-in-part of U.S. patent application Ser. No. 11/047,465, entitled METHOD AND SYSTEM FOR INTERACTIVE MAPPING TO PROVIDE GOAL-ORIENTED INSTRUCTIONS, naming Edward K. Y. Jung; Royce A. Levien; Robert W. Lord; Mark A. Malamud; and John D. Rinaldo, Jr. as inventors, filed 31 Jan. 2005, and issued 1 Jun. 2010 as U.S. Pat. No. 7,729,708, which is currently co-pending or is an application of which a currently co-pending application is entitled to the benefit of the filing date.

RELATED APPLICATIONS

None.

The United States Patent and Trademark Office (USPTO) has published a notice to the effect that the USPTO's computer program require that patent applications both reference a serial number and indicate whether an application is a continuation, continuation-in-part, or divisional of a parent application. Stephen G. Kunin, *Benefit of Prior-Filed Application*, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listing of applications provided above is inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

TECHNICAL FIELD

The present application relates generally to maps.

SUMMARY

In one aspect, a method for adjusting a map-based guide includes but is not limited to receiving a request for the map-based guide; determining a location associated with the request; preparing a route in accordance with the location associated with the request and in accordance with at least one of a profit-motive and/or a goodwill factor; and transmitting the map-based guide. In addition to the foregoing, other method aspects are described in the claims, drawings, and text forming a part of the present application.

In another aspect, a method for a display device to receive a map-based guide through a predefined area includes but is not limited to transmitting a request for the map-based guide of the predefined area, the request including an identifier associated with the display device; and receiving the map-based guide of the predefined area, the map-based guide including a route through the predefined area based on the identifier, the identifier enabling a server-based decision-making process to determine the routing. In addition to the foregoing, other method aspects are described in the claims, drawings, and text forming a part of the present application.

In another aspect, a computer program product can include a signal bearing medium bearing one or more instructions including, but not limited to one or more instructions for receiving a request for the map-based guide; determining a location associated with the request; preparing a route in accordance with the location associated with the request and in accordance with at least one of a profit-motive and/or a goodwill factor; and transmitting the map-based guide. In addition to the foregoing, other program product aspects are described in the claims, drawings, and text forming a part of the present application.

In another aspect, a computer program product can include a signal bearing medium bearing one or more instructions including, but not limited to one or more instructions for transmitting a request from a display device, the request for a map-based guide of a predefined area, the request including an identifier associated with the display device; and instructions for receiving the map-based guide of the predefined area, the map-based guide including a route through the predefined area based on the identifier, the identifier enabling a server-based decision-making process to determine the routing. In addition to the foregoing, other program product aspects are described in the claims, drawings, and text forming a part of the present application.

In another aspect, a computer program product can include a signal bearing medium bearing one or more instructions including, but not limited to, one or more instructions for receiving a request for a map-based guide from a source, the map-based guide providing a route through a predefined area; one or more instructions for determining a location associated with the request; one or more instructions for determining a level associated with remuneration if the source has provided remuneration, the route through the predefined area being a function of the level associated with the remuneration; and one or more instructions for transmitting the map-based guide. In addition to the foregoing, other program product aspects are described in the claims, drawings, and text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to a processor; a memory coupled to the processor; a receiver coupled to the processor; and a map-based guide module coupled to the receiver and the memory. The map-based guide module can include a data store configurable to hold data related to routes through a predefined area and a route determination module coupled to the data store, the route determination module configurable to determine a route through the predefined area based on an identifier received by the receiver, the identifier determinative of a number and type of locations to include with a route to include in a map-based guide through the predefined area. In addition to the foregoing, other system aspects are described in the claims, drawings, and text forming a part of the present application.

In addition to the foregoing, various other method, system, and/or computer program product aspects are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the text set forth herein.

BRIEF DESCRIPTION OF THE DRAWINGS

A better understanding of the subject matter of the application can be obtained when the following detailed description of the disclosed embodiments is considered in conjunction with the following drawings, in which.

DETAILED DESCRIPTION OF THE DRAWINGS

Those with skill in the computing arts will recognize that the disclosed embodiments have relevance to a wide variety of applications and architectures in addition to those described below. In addition, the functionality of the subject matter of the present application can be implemented in software, hardware, or a combination of software and hardware. The hardware portion can be implemented using specialized logic; the software portion can be stored in a memory or recording medium and executed by a suitable instruction execution system such as a microprocessor.

Figure 1:
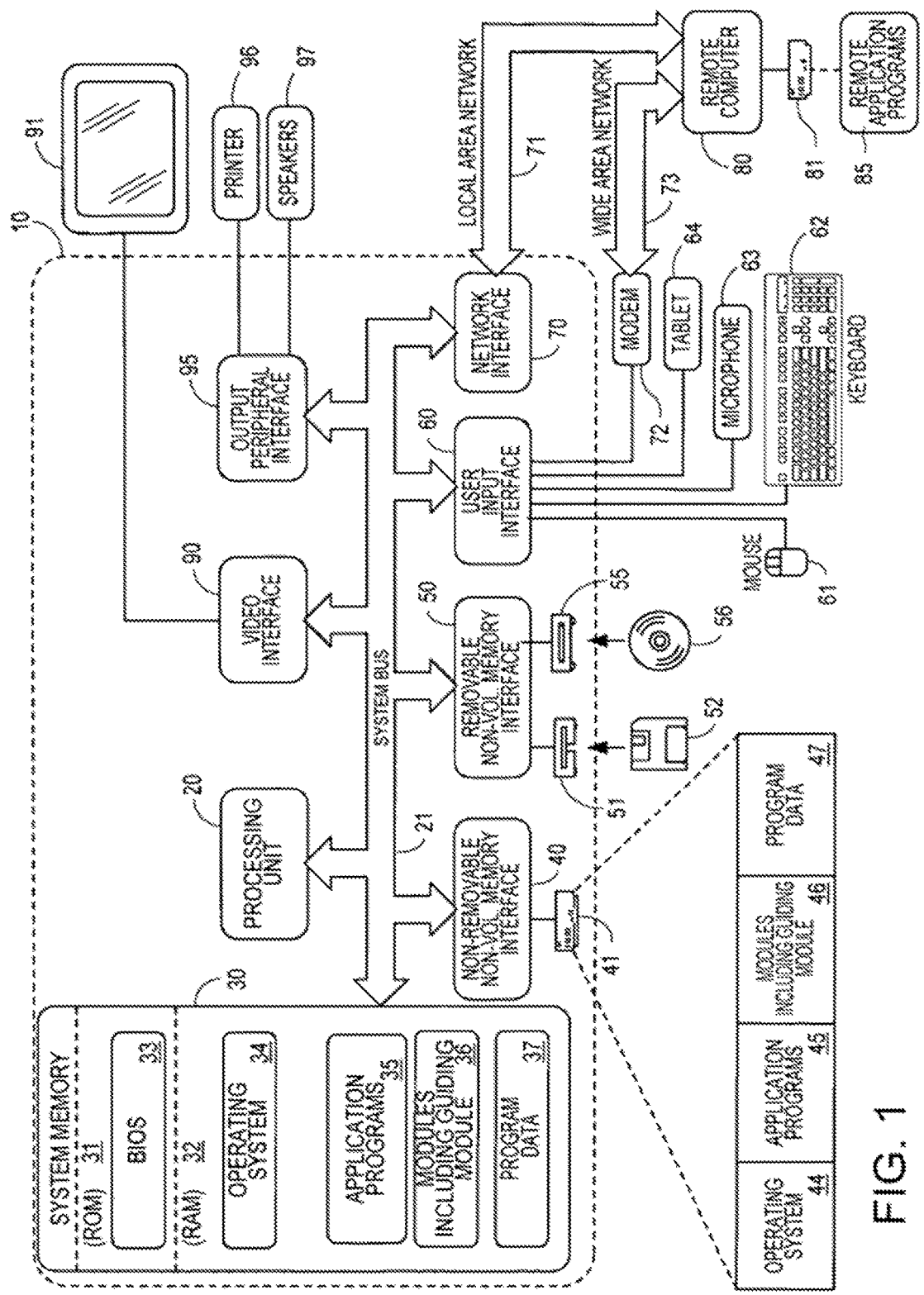
FIG. 1 is a block diagram of an exemplary computer architecture that supports the claimed subject matter.

With reference to FIG. 1, depicted is an exemplary computing system for implementing the embodiments and includes a general purpose computing device in the form of a computer 10. Components of the computer 10 may include, but are not limited to, a processing unit 20, a system memory 30, and a system bus 21 that couples various system components including the system memory 30 to the processing unit 20. The system bus 21 may be any of several types of bus structures including, but not limited to, a memory bus or memory controller, a peripheral bus, and/or a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 10 typically includes a variety of computer readable media. Computer readable media can be any available media that can be accessed by the computer 10 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 10. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 30 includes computer storage media in the form of volatile and/or nonvolatile memory such as read only memory (ROM) 31 and random access memory (RAM) 32. A basic input/output system 33 (BIOS), containing the basic routines that help to transfer information between elements within computer 10, such as during start-up, is typically stored in ROM 31. RAM 32 typically contains data and/or program modules that are immediately accessible to and/or presently being operated on by processing unit 20. By way of example, and not limitation, FIG. 1 illustrates operating system 34, application programs 35, other program modules 36, and program data 37. FIG. 1 is shown with program modules 36 including a guiding module in accordance with an embodiment as described herein.

The computer 10 may also include other removable/non-removable, volatile/nonvolatile computer storage media. By way of example only, FIG. 1 illustrates a hard disk drive 41 that reads from or writes to non-removable, nonvolatile magnetic media, a magnetic disk drive 51 that reads from or writes to a removable, nonvolatile magnetic disk 52, and an optical disk drive 55 that reads from or writes to a removable, nonvolatile optical disk 56 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, or the like. The hard disk drive 41 is typically connected to the system bus 21 through a non-removable memory interface such as interface 40, and magnetic disk drive 51 and optical disk drive 55 are typically connected to the system bus 21 by a removable memory interface, such as interface 50.

The drives and their associated computer storage media, discussed above and illustrated in FIG. 1, provide storage of computer readable instructions, data structures, program modules and other data for the computer 10. In FIG. 1, for example, hard disk drive 41 is illustrated as storing operating system 44, application programs 45, and other program modules, such as guiding module 46 and program data 47. Program modules 46 is shown including an guiding module, which can be configured as either located in guiding modules 36 or 46, or both locations, as one with skill in the art will appreciate. Note that these components can either be the same as or different from operating system 34, application programs 35, other program modules, guiding module 36, and program data 37. Operating system 44, application programs 45, guiding module 46, and program data 47 are given different numbers here to illustrate that, at a minimum, they are different copies. A user may enter commands and information into the computer 10 through input devices such as a tablet or electronic digitizer 64, a microphone 63, a keyboard 62 and pointing device 61, commonly referred to as a mouse, trackball or touch pad. Other input devices (not shown) may include a joystick, game pad, satellite dish, scanner, or the like. These and other input devices are often connected to the processing unit 20 through a user input interface 60 that is coupled to the system bus, but may be connected by other interface and bus structures, such as a parallel port, game port or a universal serial bus (USB). A monitor 91 or other type of display device is also connected to the system bus 21 via an interface, such as a video interface 90. The monitor 91 may also be integrated with a touch-screen panel or the like. Note that the monitor and/or touch screen panel can be physically coupled to a housing in which the computing device 10 is incorporated, such as in a tablet-type personal computer. In addition, computers such as the computing device 10 may also include other peripheral output devices such as speakers 97 and printer 96, which may be connected through an output peripheral interface 95 or the like. A display device, for purposes of this patent application can include an e-paper display, a liquid crystal display or the like.

The computer 10 may operate in a networked environment using logical connections to one or more remote computers, such as a remote computer 80. The remote computer 80 may be a personal computer, a server, a router, a network PC, a peer device or other common network node, and typically includes many or all of the elements described above relative to the computer 10, although only a memory storage device 81 has been illustrated in FIG. 1. The logical connections depicted in FIG. 1 include a local area network (LAN) 71 and a wide area network (WAN) 73, but may also include other networks. Such networking environments are commonplace in offices, enterprise-wide computer networks, intranets and the Internet. For example, in the subject matter of the present application, the computer system 10 may comprise the source machine from which data is being migrated, and the remote computer 80 may comprise the destination machine. Note however that source and destination machines need not be connected by a network or any other means, but instead, data may be migrated via any media capable of being written by the source platform and read by the destination platform or platforms.

When used in a LAN or WLAN networking environment, the computer 10 is connected to the LAN through a network interface or adapter 70. When used in a WAN networking environment, the computer 10 typically includes a modem 72 or other means for establishing communications over the WAN 73, such as the Internet. The modem 72, which may be internal or external, may be connected to the system bus 21 via the user input interface 60 or other appropriate mechanism. In a networked environment, program modules depicted relative to the computer 10, or portions thereof, may be stored in the remote memory storage device. By way of example, and not limitation, FIG. 1 illustrates remote application programs 85 as residing on memory device 81. It will be appreciated that the network connections shown are exemplary and other means of establishing a communications link between the computers may be used.

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those of skill in the art will appreciate that some of the acts and operations described hereinafter can also be implemented in hardware.

Figure 2:
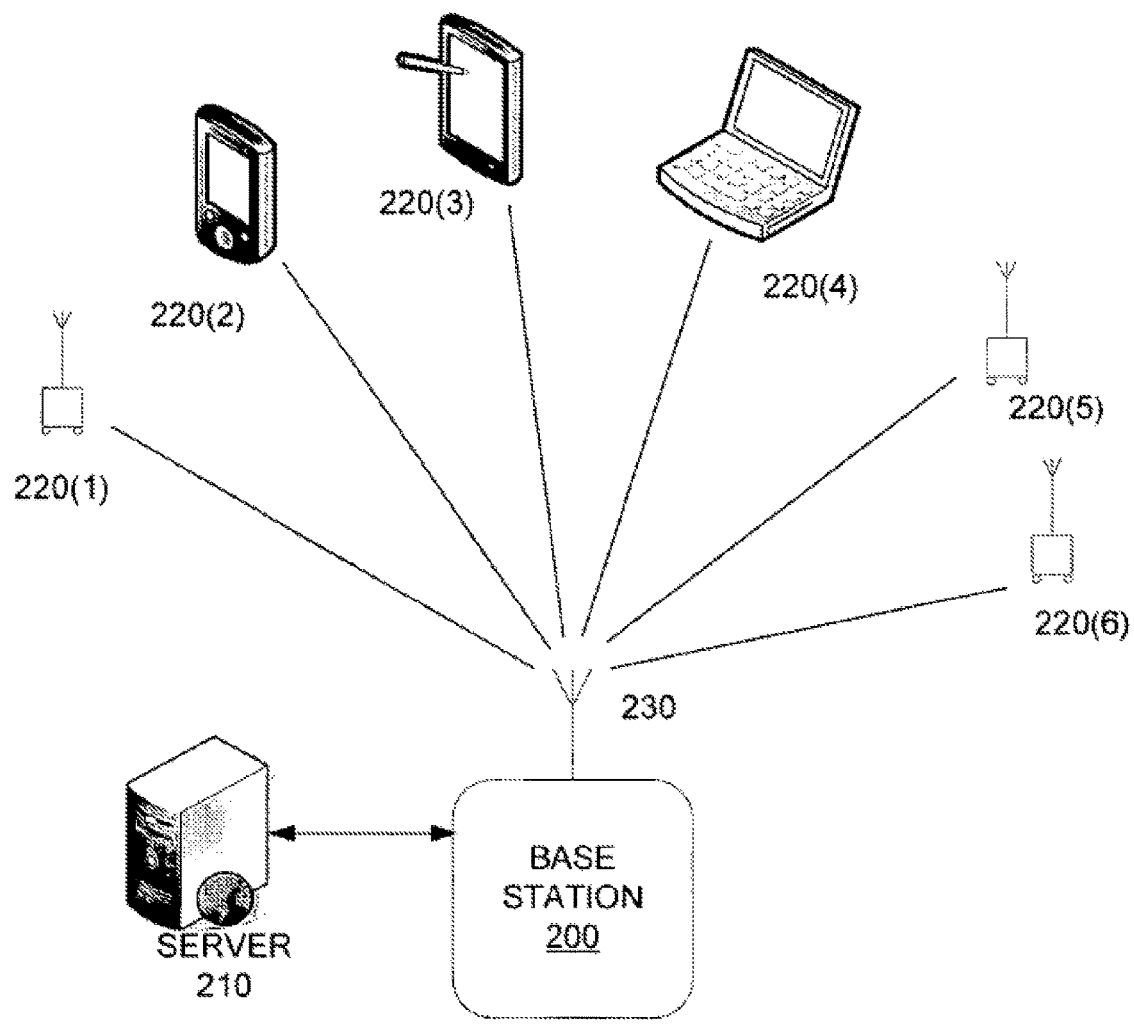
FIG. 2 is a block diagram of a wireless computer environment appropriate for embodiments of the subject matter of the present application.

Referring to FIG. 2, a diagram of a wireless network appropriate for some embodiments herein is shown. The wireless network includes a base station 200, which can be coupled to a server 210. Base station 200 interacts with a plurality of wireless components 220, which may be receivers only (or with receive and transmit capability), designed to receive real time images and associated data as correlated and transmitted by server 210. Components interact with base station 200 via wireless connection 230. The wireless connection 230 could include cellular modems, a radio-frequency (RF) methods and/or wireless local area network (WLAN). A wireless connection may include a portion of the route between the endpoints transmitted via a wired line, e.g. a fiber Internet backbone or an internal wired network coupling the server with wireless transmission hardware or base station. Another type of wireless connection could be a tracking tag system. Tracking tags typically communicate with a base station, each tag transmitting a unique code to identify a display device to which it is attached. WLANs operate by connecting mobile devices to a base station and using signal strength sensing to determine a location of a mobile device. Other wireless connections appropriate for embodiments include satellite connections, IEEE 802.11 connections or Bluetooth-type connections or the like as one of skill in the art with the benefit of the present disclosure will appreciate.

Components 220 can include receivers and transmitters to interact with server 210. Components 220 are shown including different types of components, including components 220(1) which could be a simple device capable of only receiving and displaying data and images. The data may include one or more of written directions, a map, and images or the like. Component 220(2) is shown as a personal electronic assistant, which could be configured to both send and/or receive data, display maps and/or directions as generated by server 210. Component 220(3) is shown as a tablet personal computer (PC) which can also be configured to both send and/or receive data. Component 220(4) is shown as a laptop or notebook computer which can also send and/or receive data and/or directions. Components 220(5) could be implemented as a simple mobile device which could be configured to receive and display images that could be in real time. Component 220(6) could be implemented as a cellular telephone or pager and include a display configured to show a map and images in accordance with embodiments herein. Components 220 may include electronics for determining a location, which could include sensing location via signal received by satellite such as GPS or GLONASS, motion sensors such as accelerometers or gyroscopes, or means for triangulating position via sensing power and/or distance from cellular towers or other landmarks, etc.

In an alternative embodiment, components 220 could be devices that are not coupled to a wireless network of any kind Rather, in the embodiment, a component 220 could be configured to receive data and store data internally for later mobile use.

Figure 3:
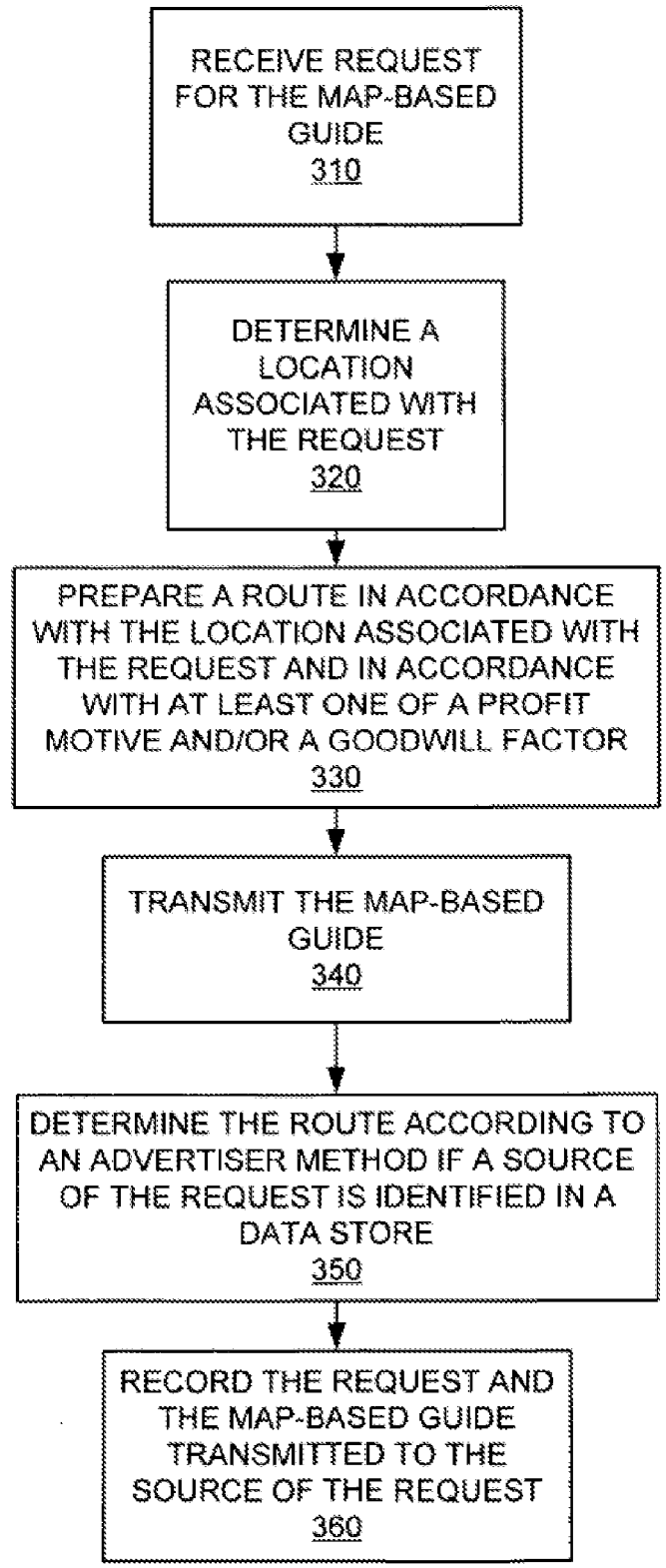
FIG. 3 is a flow diagram illustrating a method in accordance with an embodiment of the subject matter of the present application.

Referring now to FIG. 3, a flow diagram illustrates a method in accordance with an embodiment, in which the components wirelessly connected to the base station 200 and server 210 are coupled to receive map-based guides of an area. More particularly, the embodiment is directed to a method for adjusting a map-based guide. Block 310 provides for receiving a request for the map-based guide. More particularly, in an embodiment, the request can include an identifier associated with a destination in a predefined area and a location parameter identifying a starting location, the request being for a map-based guide from the starting location to the destination. Also, the receiving a request can include receiving a transmission from a mobile device wirelessly transmitting the request to a server.

Block 320 provides for determining a location associated with the request. In an embodiment, the determining can be accomplished by associating the request with a data store entry in the data store, the data store identifying whether a source of the request is entitled to a supported map-based guide. A supported map-based guide can mean a map-based guide that is supported as determined by a server. A supported map-based guide can also mean a map-based guide for which compensation for the map-based guide is provided by another form of support than the source of the request. For example, in one embodiment, the compensation for the map-based guide can come from advertisers that would have the server provide a map-based guide that directs the source past locations chosen by the advertiser. Thus, the supported map-based guide can include any guide for which compensation is from an advertiser, at least in part. To determine whether compensation has been received the data store can provide entries associated with sources that have provided compensation. If a source has no entry associated in the data store, in an embodiment, the server can assume that no compensation has been provided.

Matching the association with a data store entry in the data store can also include comparing the source to a list of sources that have provided remuneration for the map-based guide and determining a level associated with the remuneration if the source has provided remuneration. Thus, if at least partial compensation is provided by the source, then the number of locations an advertiser would prefer to have the source receive in a route can be limited.

In one embodiment, the route through the predefined area can be a function of the level associated with the remuneration. For example, the map-based guide could provide an efficient route through the predefined area if the level indicates a higher level of remuneration from the source. Conversely, a lower level of remuneration from the source could cause the server to provide a higher level of advertiser-chosen locations in a route to be provided to the source. As another example, the map-based guide can be configured to be source-centric. More particularly, in an embodiment, providing a source-centric route through the predefined area can include adjusting an influence of either or both of a profit motive and/or goodwill if the level associated with remuneration indicates a higher level of remuneration from the source. The remuneration can be in the form of payment or in the form of charitable works. For example, if a source has volunteered for an organization, rather than payment, the remuneration can be in the form of volunteer hours performed or the like.

Block 330 provides for preparing a route in accordance with the location associated with the request and in accordance with at least one of a profit-motive and/or a goodwill factor. In one embodiment, the preparing can include determining a supported map-based guide for transmission, the supported map-based guide providing the route. The route can include guiding past one or more locations associated with compensation for providing the route past the location, guiding based on a profit motive, and/or guiding based on a server-directed decision-making process and/or a goodwill motive. More particularly, the preparing in accordance with a profit motive and/or a goodwill factor can include preparing a route in accordance with the profit motive, the profit motive including a revenue-generating goal known to a server preparing the route. The route can include commercial establishments as a function of meeting the revenue-generating goal. Thus, for example, if the revenue-generating goal is met, the route can include fewer or no commercial establishments. In another embodiment, preparing a route in accordance with the goodwill factor can include directing the route past one or more server-directed locations that are determined according to a predetermined number of visitors for the one or more server-directed locations. Thus, rather than a profit motive, the route can include directing patrons past a location to increase goodwill for the location or an establishment near the location. For example, an amusement park with a new ride therein can develop goodwill for the new ride by having a server direct patrons past the new ride. Additionally, the goodwill can be a business-related goodwill or goodwill that is independent of a business relationship. For example, goodwill can be based on charitable goals known to a server, such as guiding past a humane society establishment to encourage those following the route to adopt homeless animals or the like.

Block 340 provides for transmitting the map-based guide. In one embodiment, the map-based guide of the predefined area to the source can include a bundle of one or more advertising locations in the map-based guide.

Block 350 provides for determining the route according to an advertiser method if the source of the request is identified in a data store. The determining the route according to an advertiser method if the source of the request is identified in the data store can include associating the identifier with a status hierarchy, the status hierarchy providing a number of advertiser locations by which the route is directed.

Block 360 provides for recording the request and the map-based guide transmitted to the source of the request. The recording the request and the map-based guide transmitted to the source of the request can include altering the data store to indicate the request, and associating one or more locations on the route with the source of the request.

Figure 4:
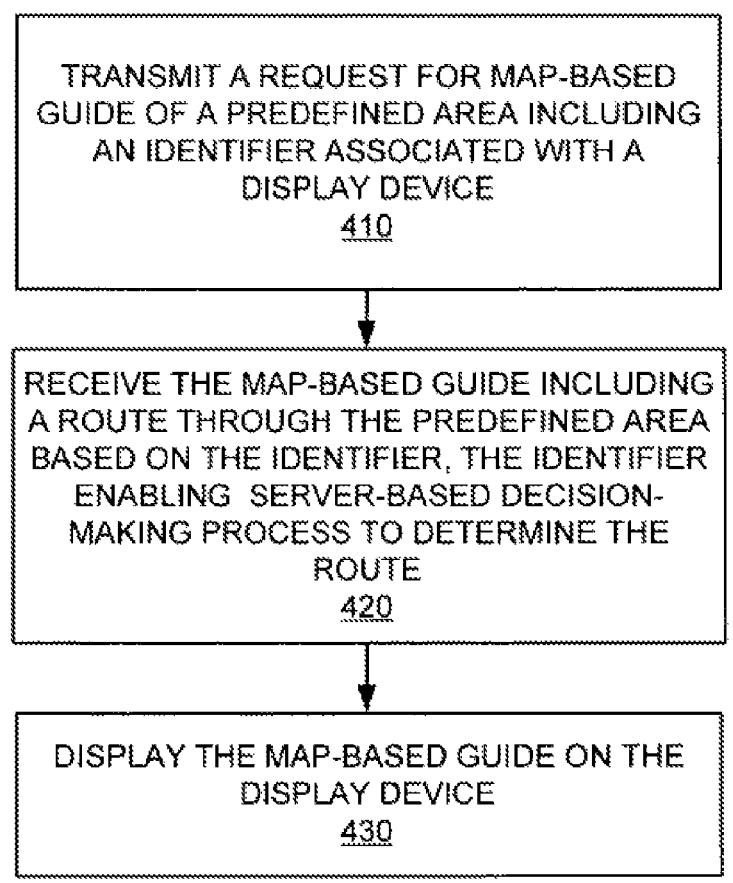
FIG. 4 is a flow diagram illustrating a method in accordance with an embodiment of the subject matter of the present application.

Referring now to FIG. 4, a flow diagram illustrates a method for a display device to receive a map-based guide through a predefined area. Block 410 provides for transmitting a request for the map-based guide of the predefined area, the request including an identifier associated with the display device. The request can include the identifier to enable determining whether the identifier is located on a data store on a server. More particularly, a server receiving the identifier can use the identifier to determine the route through the predefined area according to a server-based decision-making process by matching the identifier to an entry on the data store to determine a number of advertiser locations to include with the route.

Block 420 provides for receiving the map-based guide of the predefined area, the map-based guide including a route through the predefined area based on the identifier. The identifier can enable a server-based decision-making process to determine the routing. The receiving the map-based guide of the predefined area, the map-based guide including a route through the predefined area based on the identifier, the identifier enabling a server-based decision-making process to determine the routing can include receiving one or more advertisements with the map-based guide, the advertisements associated with one or more locations on the route through the predefined area. The receiving can also include connecting with a server, the server determining the route through the predefined area according to the server-based decision-making process. The connecting to the server can be over a wireless network by transmitting via one of a wireless LAN (WLAN), an IEEE 802 type wireless network, a cellular wireless network, a Bluetooth type wireless network, and/or a satellite network.

Block 430 provides for displaying the map-based guide on the display device, the map-based guide providing the route to a destination included in the request.

Referring back to FIG. 1, in one embodiment, a computer system includes a module, shown in FIG. 1 as map-based guide modules 36 and 46. Map-based guide modules 36 and 46 can be coupled to a computer system memory and processor. For purposes of the present application, a map-based guide module coupled to the memory can include but is not limited to a map-based guide module with all module components within the memory, a map-based guide module only partially coupled to the memory and partially coupled to other components such as to firmware, and/or a map-based guide module including only some components coupled to the memory and other components in another memory, such as RAM or ROM or a storage that can be manipulated.

In an embodiment, the map-based guide module is configurable to create one or more map-based guides for a predefined area. The map-based guide module can be included with a mobile device or can be included as part of a server, such as server 210 that creates transmissions for the mobile device to display. If a server performs the processing, an embodiment includes a transmitter configured to transmit the map-based guide to the mobile device. The map-based guide can also be transmitted to a fixed device, such as a display device.

In one embodiment, a computer system can include a processor, a memory coupled to the processor, a receiver coupled to the processor, and/or a map-based guide module coupled to the receiver and the memory. In the embodiment, the map-based guide module includes a data store configurable to hold data related to routes through a predefined area. More particularly, the data can include many possible routes through an area including, but not limited to, routes going past locations related to advertisers supporting the computer system via remuneration. The data store can also include a table of identifiers associated with possible sources of requests for map-based guides.

The map-based guide module further includes a route determination module coupled to the data store. The route determination module can be configurable to determine a route through the predefined area based on an identifier received by the receiver. For example, an identifier can be from a source of a request for a map-based guide. The identifier can be determinative of a number of locations and a type of locations to include with a route to include in a map-based guide through the predefined area. For example, the identifier can identify whether the map-based guide providing the route should include guiding past one or more locations associated with compensation for providing the route past the location, guiding based on a profit motive, and/or guiding based on a server-directed decision-making process.

In one embodiment, the computer system includes a transmitter coupled to the processor. The transmitter can be configurable to transmit the map-based guide to a display device. The display device be a mobile device, such as a cell phone, a computer device, a PDA or the like configurable to transmit a request for the map-based guide to include the route being through the predefined area.

While the subject matter of the application has been shown and described with reference to particular embodiments thereof, it will be understood by those skilled in the art that the foregoing and other changes in form and detail may be made therein without departing from the spirit and scope of the subject matter of the application, including but not limited to additional, less or modified elements and/or additional, less or modified steps performed in the same or a different order.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution.

Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

We claim:

1. A system, comprising:

means for transmitting a map-based guide request, the map-based guide request including at least an identifier and a search term;

means for determining at least one location associated with the map-based guide request;

means for identifying if a source of the map-based guide request is entitled to a supported map-based guide;

means for receiving a response to the map-based guide request, the response including location data associated with one or more locations; and means for displaying one or more indications of the one or more locations at least partially based on the response.

2. A method, comprising:

transmitting a map-based guide request, the map-based guide request including at least an identifier and a search term;

determining at least one location associated with the map-based guide request;

identifying if a source of the map-based guide request is entitled to a supported map-based guide;

receiving a response to the map-based guide request, the response including location data associated with one or more locations; and displaying one or more indications of the one or more locations at least partially based on the response, wherein at least one of the transmitting, receiving, or displaying is at least partially implemented using one or more processing devices.

3. A system, comprising:-ADa circuitry configured for transmitting a map-based guide request, the map-based guide request including at least an identifier and a search term;

circuitry configured for determining at least a location associated with the map-based guide request;

circuitry configured for identifying if a source of the map-based guide request is entitled to a supported map-based guide;

circuitry configured for receiving a response to the map-based guide request, the response including location data associated with one or more locations; and circuitry configured for displaying one or more indications of the one or more locations at least partially based on the response.

4. The system of claim 3, further comprising:
circuitry configured for preparing a route in accordance with at least one of the one or more locations and in accordance with at least one of a profit motive or a goodwill factor.

5. The system of claim 3, wherein circuitry configured for transmitting a map-based guide request, the map-based guide request including at least an identifier and a search term comprises:
circuitry configured for transmitting a map-based guide request, the map-based guide request including at least a location parameter identifying a starting location as the identifier and an indication associated with a destination in a predefined area as the search term.

6. The system of claim 3, further comprising:
circuitry configured for receiving a selection of at least one of the one or more locations at least partially via a user interface of the system; and
circuitry configured for displaying at least one link associated with directions to the selected at least one location.

7. The system of claim 6, further comprising:
circuitry configured for displaying at least one link associated with at least one of reviews or hours of operation of the selected at least one location.

8. The system of claim 6, further comprising:
circuitry configured for displaying at least one link associated with placing a phone call via the system to the selected at least one location.

9. The system of claim 3, wherein circuitry configured for transmitting a map-based
guide request, the map-based guide request including at least an identifier and a search term comprises:
circuitry configured for transmitting a map-based guide request, the map-based guide request including at least an identifier and a search term, the identifier including at least an identification of location of the system.

10. The system of claim 3, wherein circuitry configured for transmitting a map-based guide request, the map-based guide request including at least an identifier and a search term comprises:
circuitry configured for transmitting a map-based guide request, the map-based guide request including at least an identifier and a search term, the identifier including at least an identification of an account usable by the system to log into a website.

11. The system of claim 3, wherein circuitry configured for transmitting a map-based guide request, the map-based guide request including at least an identifier and a search term comprises:
circuitry configured for transmitting a map-based guide request, the map-based guide request including at least an identifier and a search term, the identifier including at least one of a phone number, a network address, or a serial number associated with the system.

12. The system of claim 3, wherein circuitry configured for transmitting a map-based guide request, the map-based guide request including at least an identifier and a search term comprises:
circuitry configured for transmitting a map-based guide request, the map-based guide request including at least an identifier and a search term, the search term received by the system at least partially via a user interface of the system.

13. The system of claim 3, wherein circuitry configured for transmitting a map-based guide request, the map-based guide request including at least an identifier and a search term comprises:
circuitry configured for transmitting a map-based guide request, the map-based guide request including at least an identifier and a search term, the search term including at least one of a name of a geographic location, an at least partial physical address of a geographic location, a name of a commercial entity, or a category of commercial entity.

14. The system of claim 3, wherein circuitry configured for receiving a response to the map-based guide request, the response including location data associated with one or more locations comprises:
circuitry configured for receiving a response to the map-based guide request, the response associated with a server-based decision-making process.

15. The system of claim 3, wherein circuitry configured for receiving a response to the map-based guide request, the response including location data associated with one or more locations comprises:
circuitry configured for receiving a response to the map-based guide request, the response associated with a server-based decision-making process including at least determining, using an advertiser method, one or more advertisers at least partially based on an indication of location of the system transmitted as the identifier included in the map-based guide request, the response including at least some location data associated with the one or more advertisers.

16. The system of claim 3, wherein circuitry configured for receiving a response to the map-based guide request, the response including location data associated with one or more locations comprises:
circuitry configured for receiving a response to the map-based guide request, the response associated with a server-based decision-making process including at least determining the one or more locations at least partially based on an indication of locations associated with location extensions related to online advertising.

17. The system of claim 3, wherein circuitry configured for displaying one or more indications of the one or more locations at least partially based on the response comprises:
circuitry configured for displaying a map-based guide at least partially based on the response.

18. The system of claim 3, wherein circuitry configured for displaying one or more indications of the one or more locations at least partially based on the response comprises:
circuitry configured for displaying a map-based guide at least partially based on the response, the map-based guide determined by the system and including at least some data related to the one or more locations.

19. The system of claim 3, wherein circuitry configured for displaying one or more indications of the one or more locations at least partially based on the response comprises:
circuitry configured for displaying a map-based guide at least partially based on the response, the map-based guide determined by the system and including at least some advertising related to the one or more locations, the at least some advertising related to the one or more locations determined by a server-based decision-making process.

20. The system of claim 3, wherein circuitry configured for displaying one or more indications of the one or more locations at least partially based on the response comprises:

circuitry configured for displaying a map-based guide at least partially based on the response, the map-based guide determined by the system and including at least some advertising related to the one or more locations, the at least some advertising related to the one or more locations determined by a server-based decision-making process in response to location extensions associated with one or more online advertisers associated with the one or more locations.

\* \* \* \* \*